United States Patent [19]
Soejima et al.

[11] Patent Number: 5,816,599
[45] Date of Patent: Oct. 6, 1998

[54] BICYCLE TORQUE DETECTION APPARATUS AND BICYCLE INCLUDING THE SAME

[75] Inventors: Kenjiro Soejima; Hitoshi Manta, both of Tokyo, Japan

[73] Assignee: Koyo Electronics Industries Co., Ltd, Tokyo, Japan

[21] Appl. No.: 697,607

[22] Filed: Aug. 27, 1996

[30] Foreign Application Priority Data

Jun. 14, 1995 [JP] Japan ................................ 7-147054
Jun. 14, 1995 [JP] Japan ................................ 7-147056

[51] Int. Cl.⁶ ........................................ B62M 1/02
[52] U.S. Cl. .................. 280/259; 73/862.334; 74/594.2
[58] Field of Search .................................. 280/259, 260, 280/261; 73/862.325, 862.331, 862.333, 862.334; 74/594.1, 594.2

[56] References Cited

U.S. PATENT DOCUMENTS

| | | | |
|---|---|---|---|
| 4,823,620 | 4/1989 | Edo et al. ................ | 73/862.334 X |
| 4,933,580 | 6/1990 | Ishino et al. ............. | 73/862.334 X |
| 4,966,380 | 10/1990 | Mercat ..................... | 280/259 |
| 4,972,728 | 11/1990 | Yoshimura et al. ...... | 73/862.334 X |
| 5,307,691 | 5/1994 | Miyake et al. ........... | 73/862.334 X |
| 5,313,845 | 5/1994 | Hayashi et al. .......... | 73/862.334 |
| 5,526,704 | 6/1996 | Hoshina et al. .......... | 73/862.334 X |
| 5,585,574 | 12/1996 | Sugihara et al. ......... | 73/862.334 |

FOREIGN PATENT DOCUMENTS

| 6023951 | 6/1994 | Japan . |
|---|---|---|
| 8133166 | 5/1996 | Japan . |

*Primary Examiner*—Kevin Hurley
*Attorney, Agent, or Firm*—Ladas & Parry

[57] ABSTRACT

This invention is a bicycle torque detection apparatus for a bicycle having a pair of cranks each having a pedal, and a rotating shaft supporting the cranks to allow a user to step on the pedal to turn the cranks and drive a gear engaged with a chain. It comprises a detection section or rotating shaft consisting of magnetic alloy having magnetic anisotropy, the permeability of said detection section or rotating shaft being changed by torsional stress caused by the rotation of the cranks, and a coil unit disposed on the outer circumference of the detection section or rotating shaft to detect a change in the permeability of the detection section or rotating shaft.

24 Claims, 14 Drawing Sheets

BICYCLE TORQUE DETECTION APPARATUS AND BICYCLE INCLUDING THE SAME

BACKGROUND OF THE INVENTION

The present invention relates to a bicycle torque detection apparatus for automatically detecting a torque applied to a rotating shaft driven by pedals of a bicycle or equipment used for muscular strength training or exercise (hereafter referred to as a "bicycle") and a bicycle including this apparatus.

Methods for detecting a torque applied to the rotating shaft include the use of a strain gauge and the optical or magnetic detection of the torsion of the shaft as a phase shift. In some methods, a magnetostrictive material foil with a plurality of slits formed so as to be inclined relative to the direction of the rotating shaft is secured to the outer circumferential surface of the shaft and detection coils are opposed to the magnetostrictive material foil so that changes in the permeability of the magnetostrictive material foil which are caused by torsional stress caused by the torque applied to the rotating shaft is used to detect the torque.

FIG. 14 is a schematic perspective view of a bottom bracket section of a conventional bicycle. Reference numeral 1 designates a bottom bracket section. A rotating shaft 3, both ends of which are formed so as to have a square cross section, and which has a tapped hole in the center, is inserted into a cylindrical housing 2 and rotatably supported via a bearing. An adapter 6a, 6b (6b is not shown) having a lock ring 7a, 7b is screwed into both ends of the housing 2 to block them with both ends of the rotating shaft 3 allowed to protrude.

A square fitting hole disposed in the base of a crank 8a having a pedal 10a rotatably installed at its end is fitted to one end of the rotating shaft 3 and fixed with a screw, and a chain drive gear 12 having a square hole in the center is fitted on the other end of the rotating shaft 3. A fitting hole disposed in the base of a crank 8b with a pedal 10b is further fitted to the shaft 3, and screws are used to integrally fix the gear 12 and the crank 8b.

If the torque applied to the rotating shaft of the bottom bracket section of the above bicycle is to be detected, and the former of the described detection methods is to be applied, then the structure of the bottom bracket section must be substantially changed, and such a change is difficult due to the limited space. In the latter method, an adhesive comprising thermosetting resin is generally used to secure an amorphous foil to an intermediate member. The stress transfer characteristic, however, depends on the thickness of the adhesive layer, and the difference in the thermal expansion coefficient between the areas of the amorphous foil and the intermediate member which are subjected to stress significantly affects changes in the permeability of the amorphous foil.

It is thus very difficult to uniformly apply the adhesive to the intermediate layer and to apply a specified amount of adhesion pressure for heating and fixation. In addition, there are a limited number of materials with a thermal expansion coefficient almost equal to that of the amorphous foil.

SUMMARY OF THE INVENTION

It is a first objective of this invention to provide a bicycle torque detection apparatus that can be manufactured easily and which can accurately detect a torque applied to a bicycle. It is a second objective of this invention to provide a bicycle that detects a torque applied to a rotating shaft including a crank with a pedal to detect the magnitude of pedal stepping force and the amount of energy consumed during this motion based on the detected torque in order to display the results as required. It is a third objective of this invention to provide a bicycle that switches the gear when the magnitude of pedal stepping force increases or decreases.

As a bicycle torque detection apparatus having a pair of cranks with a pedal and a rotating shaft supporting the cranks to allow a user to step on the pedals to drive a gear engaged with a chain, a first embodiment of this invention provides a torque detector comprising a detection section or rotating shaft that comprises magnetic alloy, to which magnetic anisotropy is applied, and the permeability of which is changed by torsional stress caused by the rotation of the crank; and a coil unit disposed on the outer circumference of the detection section or rotating shaft to detect a change in the permeability of the detection section or rotating shaft. In this case, when the crank is rotated in the forward direction of the bicycle, the rotation is transmitted to the detection section or rotating shaft integrally coupled to the crank. The load applied by the gear causes the detection section or rotating shaft to be subjected to torsional stress, and one of two groups of slits or recessed grooves disposed in the detection section or rotating shaft is subjected to tensile stress, with the other subjected to compressive stress. Consequently, the permeability of the detection section or rotating shaft varies according to the torsional stress. Since the self-inductances of the detection coils varies with the variation of the permeability of the detection section or rotating shaft, this variation can be detected to detect the torque applied to the detection section or rotating shaft.

A second embodiment of this invention is a torque detector comprising a detection section of magnetic alloy which is formed as a bottomed cylinder and to which magnetic anisotropy is applied by groups of slits or recessed grooves formed laterally symmetrically in the cylindrical portion so as to be inclined in the opposite directions; and a coil unit formed as a bottomed cylinder, having a first and a second detection coils, and fitted on the outer circumference of the detection section so as to oppose the first and the second detection coils to the groups of the slits or recessed grooves. This embodiment enables the manufacturing of a large number of uniform products that can be manufactured easily, contributing to the reduction of costs.

According to a third embodiment, the detection section is fitted and fixed to a cylindrical boss disposed on the base of the crank on the gear side, the gear is fixed to a flange disposed on the cylindrical portion, and the coil unit is fitted on the outer circumference of the detection section and fixed to an adapter or frame that blocks the end of the housing for the rotating shaft. This constitution allows the detection section to be integrally coupled to the pair of cranks, the rotating shaft, and the gear engaged with the chain in order to transmit to the detection section the torque applied by the rotation of the crank and the tension of the chain applied to the gear.

A fourth embodiment of this invention is a torque detector comprising a rotating shaft of magnetic alloy to which magnetic anisotropy is applied by groups of recessed grooves formed laterally symmetrically on the outer circumference thereof so as to be inclined in the opposite directions; and a coil unit formed as a cylinder, having a first and a second detection coils, and fitted on the outer circumference of the rotating shaft so as to oppose the first and the second detection coils to the groups of the recessed grooves.

When the crank is rotated in the forward direction of the bicycle, the rotation is transmitted to the rotating shaft to subject it to torsional stress. The permeability of the rotating shaft varies according to this torsional stress. This variation can be detected to detect the torque applied to the rotating shaft.

According to a fifth embodiment of this invention, the detection section or rotating shaft comprises Fe—Al or Fe—Ni alloy or Ni—Cr—Mo cement steel. This constitution is strong and provides good temperature characteristics, thereby enabling the torque applied to the rotating shaft to be detected very accurately.

A sixth embodiment of this invention is a bicycle comprising a torque detector comprising a rotating shaft of magnetic alloy to which magnetic anisotropy is applied by groups of slits or recessed grooves formed laterally symmetrically on the outer circumference thereof so as to be inclined in the opposite directions, and a coil unit having detection coils and disposed on the outer circumference of the rotating shaft; and a calculator for calculating the magnitude of pedal stepping force based on the torque detected by the torque detector. In this case, when the pedal on the gear side is stepped on, the rotational shaft is not subjected to tensional stress, and no torque is detected. On the other hand, when the pedal opposed to the gear is stepped on, the rotating shaft is subjected to tensional stress, and a torque is detected. Thus, a torque is detected only when the pedal opposed to the gear is stepped on during a single rotation of the gear.

The torque herein is applied by torsional stress generated when the pedals are stepped on. Even when the pedal on the gear side is stepped on, the tare weight of the leg acting on the pedal opposed to the gear subjects the rotating shaft to torsional stress, resulting in the detection of a torque. This torque, however, exhibits a negative value whereas the torque detected when the pedal opposed to the gear is stepped on has a positive value, so the former torque is neglected.

A seventh embodiment of this invention is a bicycle including a torque detector comprising a detection section of magnetic alloy which is generally formed as a bottomed cylinder, to which magnetic anisotropy is applied by groups of slits or recessed grooves formed laterally symmetrically in the cylindrical portion so as to be inclined in the opposite directions, and which is fixed to a gear or gear holding member and a coil unit generally formed as a bottomed cylinder, having detection coils on the inner circumference thereof, and disposed on the outer circumference of the detection section; and a calculator for calculating the magnitude of pedal stepping force based on the torque detected by the torque detector. This embodiment allows the detection section to be subjected to torsional stress whether the pedal on the gear side or the pedal opposed to the gear is stepped on, thereby enabling a torque to be detected.

According to an eighth embodiment of this invention, in the sixth or the seventh embodiment, the rotating shaft or detection section comprises Fe—Al or Fe—Ni alloy or Ni—Cr—Mo cement steel, and slits or recessed grooves can be directly formed in the rotating shaft or detection section.

According to a ninth embodiment, in the sixth or the seventh embodiment, the magnitude of pedal stepping force or the amount of consumed energy is calculated on the basis of the torque detected by the torque detector.

According to a tenth embodiment, in the sixth or the seventh embodiment, the bicycle has a gear switching means for automatically switching the gear based on the torque or the magnitude of pedal stepping force detected by the torque detector.

According to an eleventh embodiment, the bicycle includes an indicator for indicating the torque, the pedal stepping force, and/or the consumed energy.

DESCRIPTION OF THE PREFERRED EMBODIMENTS

Figure 1:
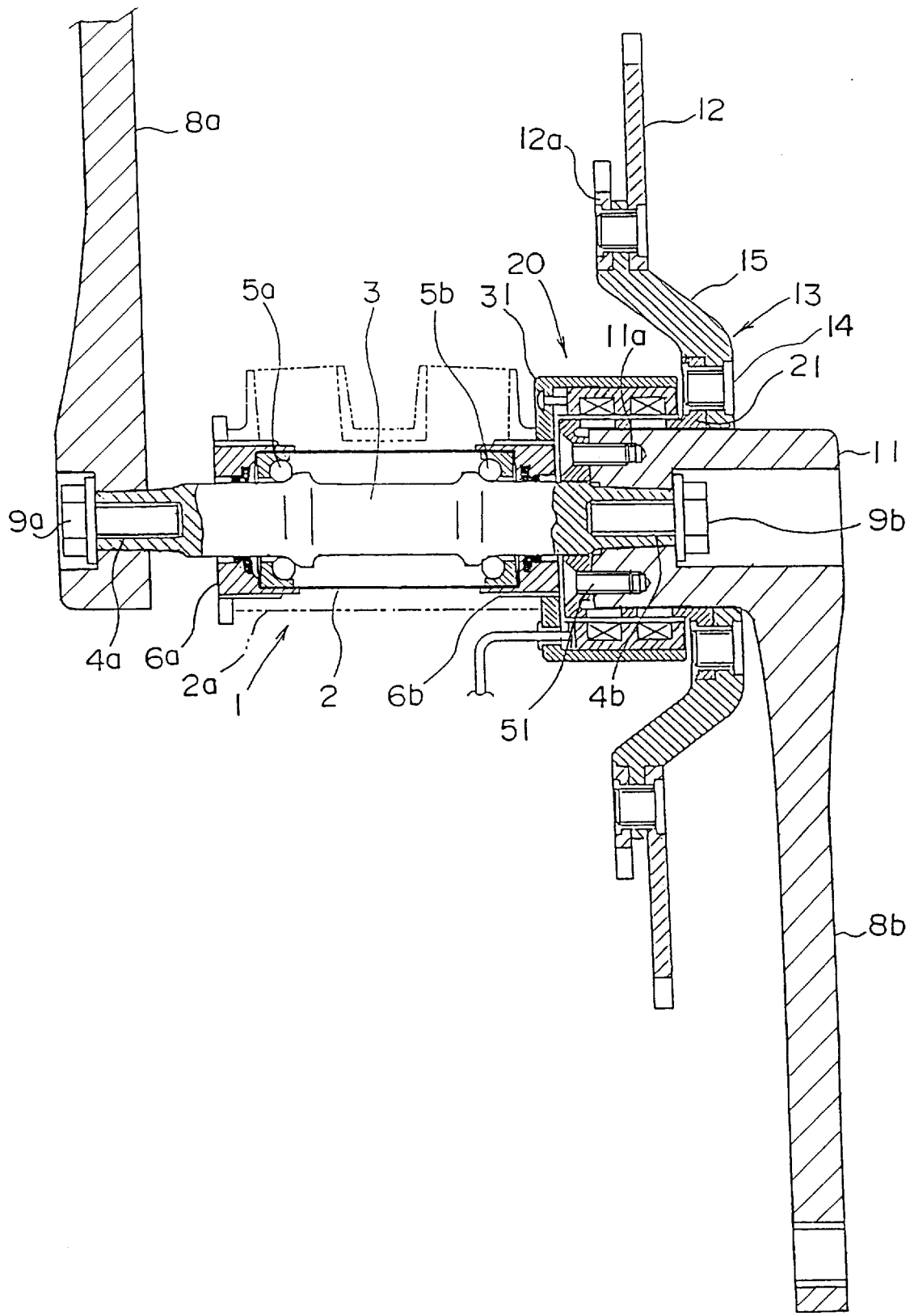
FIG. 1 is a vertical cross sectional view of one embodiment of this invention.
Figure 2:
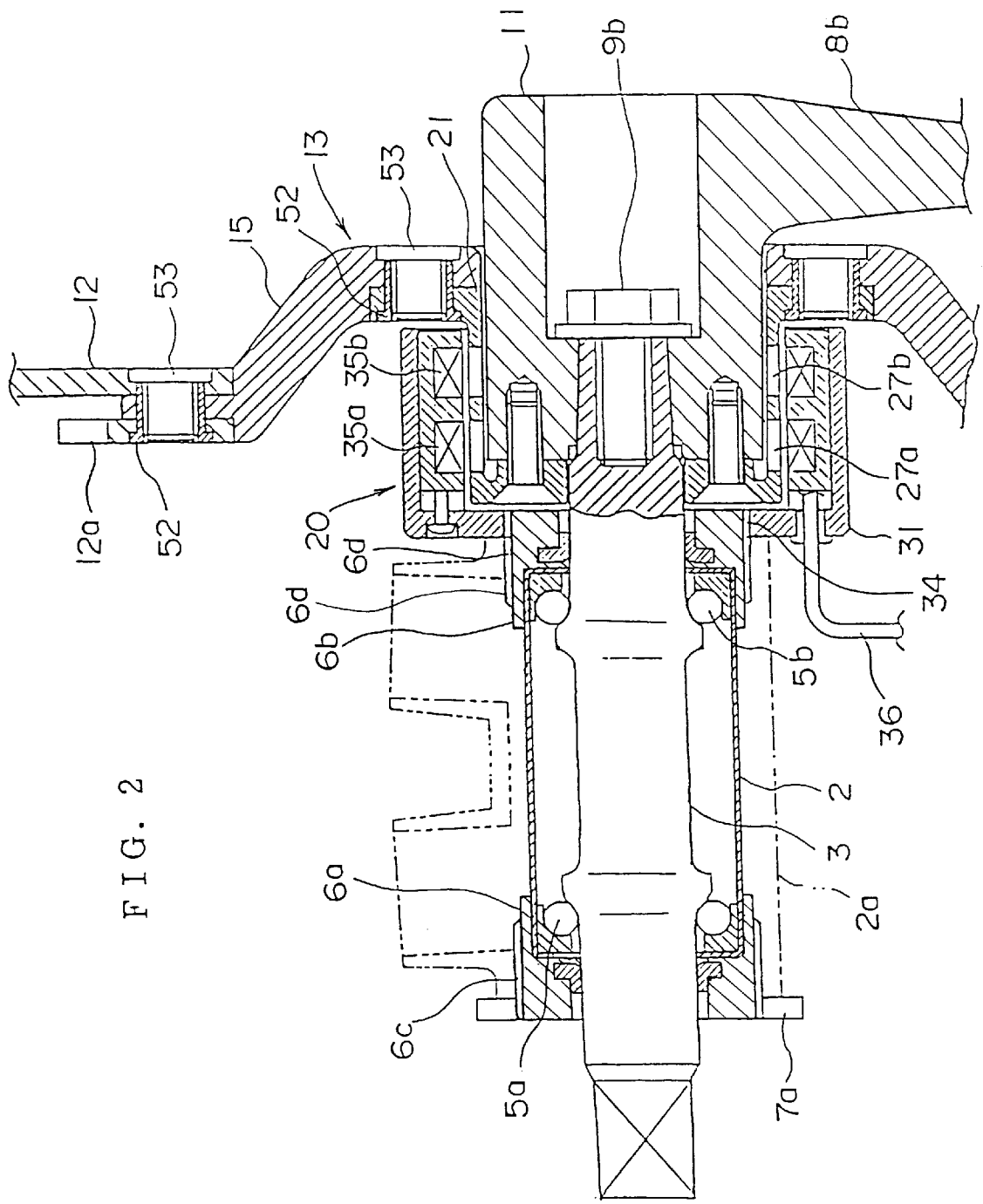
FIG. 2 is a partially enlarged view of FIG. 1.
Figure 3:
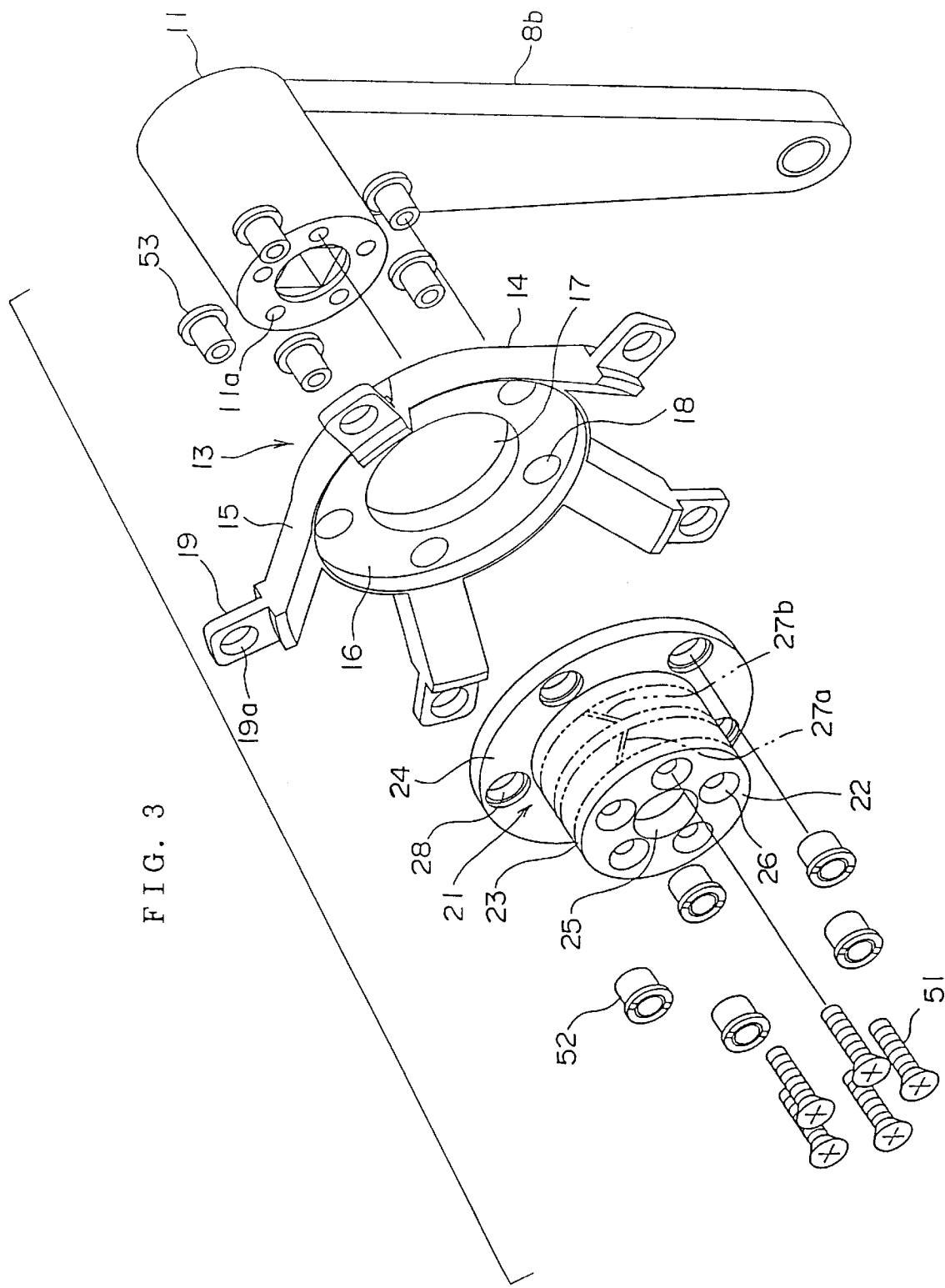
FIG. 3 is an exploded perspective view of the integral part of FIG. 1.

In FIGS. 1 to 5, reference numeral 1 is a bottom bracket section of a bicycle. For example, a rotating shaft 3, both ends of which are formed so as to have a square cross section, and which has tapped holes 4a and 4b in its center is inserted into a cylindrical housing 2 and rotatably supported via bearings 5a, 5b. Reference numerals 6a and 6b denote adapters having threads 6c and 6d, respectively, on their outer circumference and holding the housing 2 when fitted in the thread of a frame 2a and when both ends of the rotating shaft 3 are allowed to protrude, and the frame 2a is tightened and fixed by a fixing lock ring 7a screwed around the thread 6c of the adapter 6a.

Reference numeral 8a indicates a crank having a square fitting hole in its base, wherein the fitting hole is fitted to one end of the rotating shaft 3 and fixed by a bolt 9a screwed into a thread 4a, and wherein a pedal is rotatably installed at the end of the crank. Reference numeral 8b indicates a crank having a square fitting hole in its base and including a cylindrical boss 11, wherein the fitting hole is fitted to the other end of the rotating shaft 3 and fixed by a bolt 9b screwed into a thread 4b, and wherein at pedal is rotatably installed at the end of the crank.

Reference numeral 20 denotes a torque detector comprising a cylindrical portion 23 and a flange 24 and including a detector 21 shaped like a bottomed cylinder which is subjected to torsional stress when the pedals are stepped on and a coil unit 31 shaped like a bottomed cylinder and having detection coils 35a, 35b installed on its inner circumference.

The detection section 21 is made of magnetic alloy with a magnetostrictive characteristic such as Fe—Al or Fe—Ni alloy or Ni—Cr—Mo cement steel. A hole 25 into which the rotating shaft 3 is inserted is formed in the center of the bottom 22 of the detection section 21, and a plurality of screw insertion holes 26 are formed around the hole 25.

A large number of hollows in the form of slits 27a, 27b inclined laterally symmetrically in the opposite directions like chevrons are formed in the cylindrical portion 23 of the detection section 21 so as to apply magnetic anisotropy in the opposite directions. The magnetic anisotropy provided by the hollows may be in this form of recessed grooves instead of the slits 27a, 27b. Reference numerals 28 designate nut insertion holes formed in a flange 24.

Detection sections 21 were produced using Fe—Al alloy containing 11.0 to 15.0 wt. % of Al with the remaining part substantially comprising Fe, Fe—Ni alloy containing 32 to 85 wt. % of Ni with the remaining part substantially comprising Fe, and Ni—Cr—Mo cement steel (SNCM815), respectively. The cylindrical portion 23 of the detection section 21 has a thickness of 1 to 3 mm.

Figure 4:
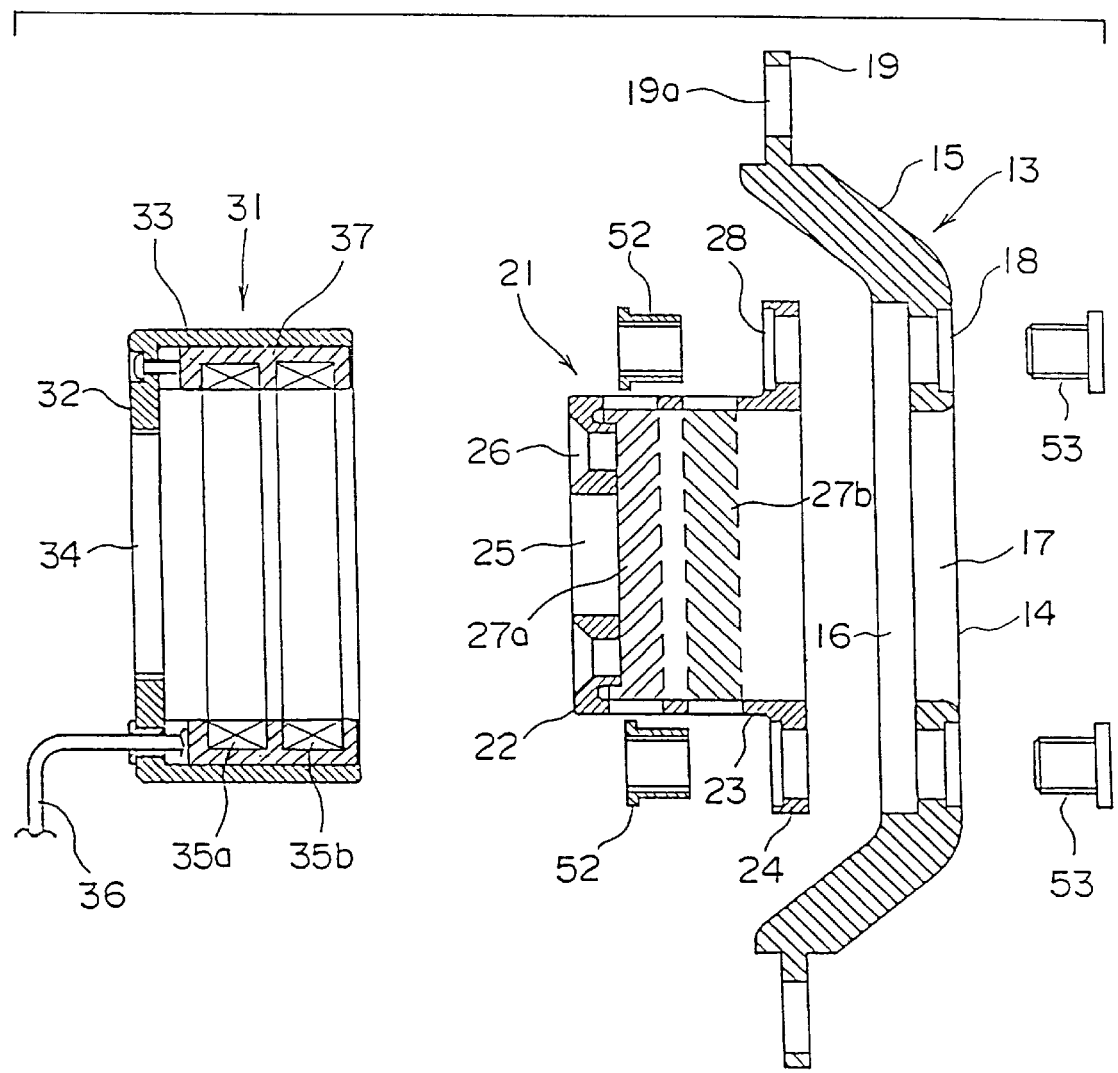
FIG. 4 is an exploded cross sectional view of the integral part of FIG. 1.
Figure 5:
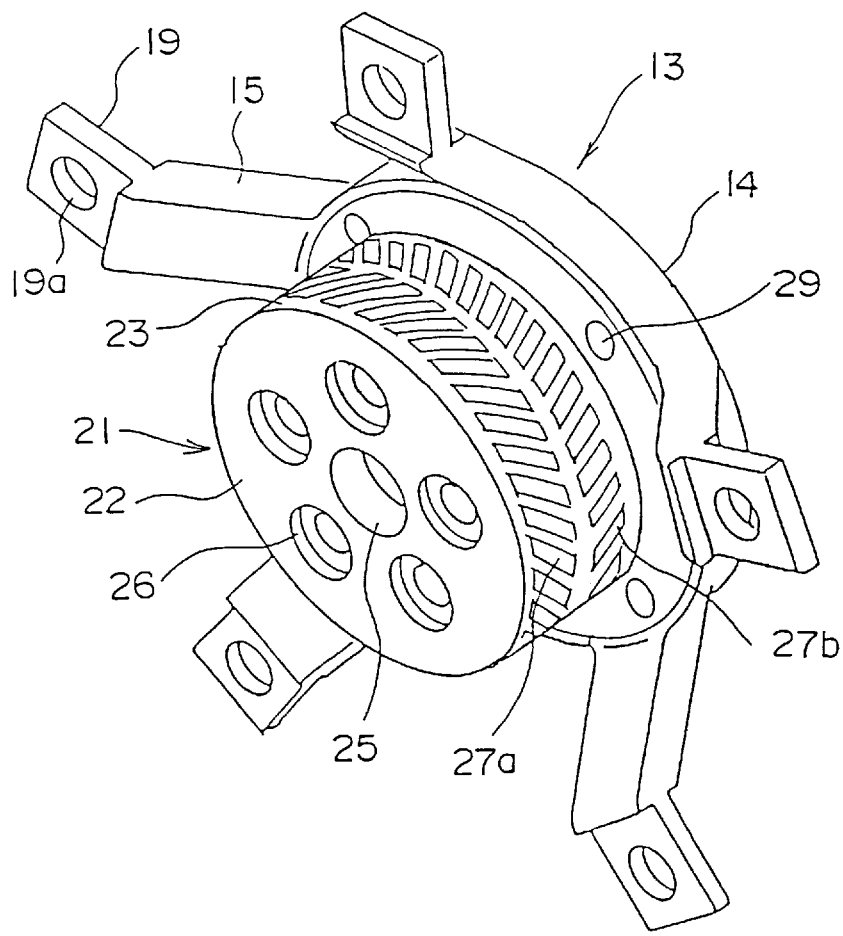
FIG. 5 is a perspective view showing the gear holding member and the detection section in FIG. 1.

As shown in FIG. 4, the coil unit 31 is formed like a bottomed cylinder, and has in its bottom 32 a tapped hole 34 with which the thread 6d formed on the outer circumference of the adapter 6b is engaged. A first and a second detection coils 35a, 35b and a yoke 37, the self-inductance of which varies in response to changes in the permeability of the detection section 21 are installed on the inner wall of the cylindrical portion 33 onto which the detection section 21 is fitted. Reference numeral 36 is an extension line from the first and the second detection coils 35a, 35b.

Reference numeral 13 denotes a gear holding member comprising a disc-like hub portion 14 and a plurality of arm portions 15 inclined and protruding inwardly relative to the outer circumference of the hub portion 14 at almost equal intervals. The hub portion 14 has a recessed portion 16 into which the flange 24 of the detection section 21 is fitted and a hole 17 into which the cylindrical boss 11 of the crank 8b is fitted. Reference numeral 18 designates a plurality of screw insertion holes formed around the outer circumference of the hole 17, and 19 is a gear mounting section standing almost vertically from the end of the arm portion 15 and having a nut insertion hole 19a. Reference numeral 12 denotes a gear with which a chain is engaged and which has in its center a hole into which the hub 14 and arm 15 portions of the gear holding member 13 are fitted.

Figure 6:
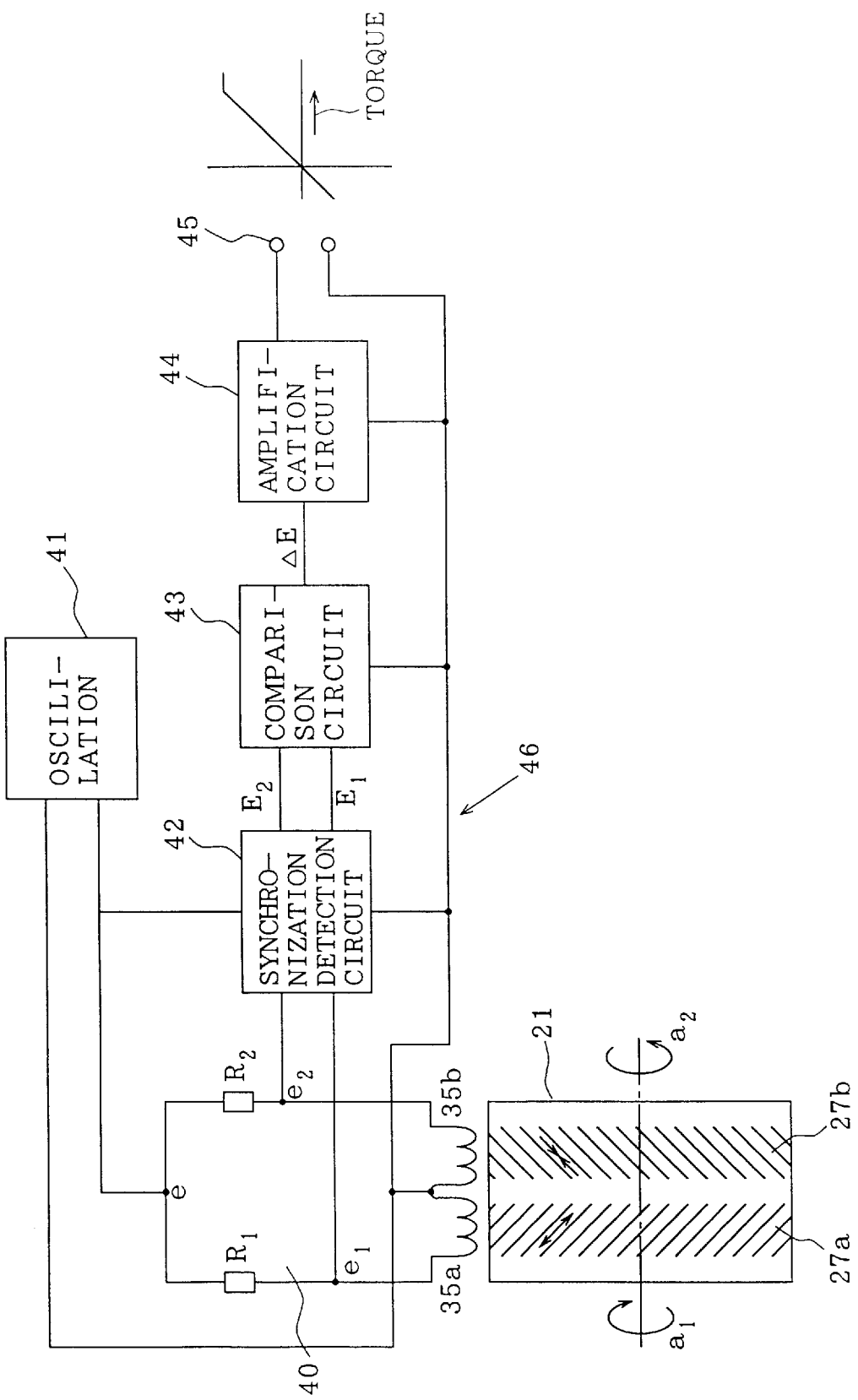
FIG. 6 is a block diagram showing one example of a torque detection circuit.

In FIG. 6, an example of torque detection is shown when the detection section 21 is subjected to torsional stress in directions a1 and a2. R1 and R2 indicate resistors and partly form a bridge circuit 40. Reference numeral 41 denotes an oscillating circuit that applies an oscillating voltage eV to the bridge circuit 40. Reference numeral 42 designates a synchronization detection circuit for detecting output AC voltages e1 and e2 in the bridge circuit 40, 43 is a comparison circuit for comparing detected DC voltages E1 and E2 to output the difference voltage ΔE, and 44 is an amplification circuit for amplifying output voltage ΔE from the comparison circuit 43. These components constitute a torque detection circuit 46.

In this torque detection circuit 46, if there is no torsional stress generated in the detection section 21, then the permeabilities $\mu 1$ and $\mu 2$ of the slits 27a and 27b, respectively, of the detection circuit 21 are maintained at an equal value. In this case, the self-inductances L1 and L2 of the detection coils 35a and 35b, respectively, are shown by:

$$L1=\mu 1 N1^2 S/l \quad \text{[Equation 1]}$$
$$L2=\mu 2 N2^2 S/l \quad \text{[Equation 2]}$$

wherein
N1: the number of windings of the detection coil 35a
N2: the number of windings of the detection coil 35b
S: the area of the cross section of the core formed by each coil
l: the length of the core formed by each coil Thus, if N1=N2 and $\mu 1=\mu 2$, then L1=L2 according to Equations 1 and 2.

The detection coils 35a and 35b and the resistors R1 and R2 form the bridge circuit 40, and the voltages e1 and e2 of the midpoints can be expressed by:

$$e1=j\omega L1/(j\omega L1+R1)\cdot e \quad \text{[Equation 3]}$$
$$e2=j\omega L2/(j\omega L2+R2)\cdot e \quad \text{[Equation 4]}$$

When the detection section 21 is subjected to torsional stress in the directions a1 and a2, the chevron-like slits 27a and 27b are also subjected to stress. That is, permeability $\mu 1$ increases because the slit 27a is subjected to tensile stress, whereas permeability $\mu 2$ decreases because the slit 27b is subjected to compressive stress.

Thus, according to Equations 3 and 4, voltage e1 at the midpoint of the bridge circuit 40 increases, while voltage e2 decreases. Voltages e1 and e2 are smoothed by the synchronization detection circuit 42, and output DC voltages E1 and E2 from the synchronization detection circuit 42 are compared by the comparison circuit 43 to output the difference voltage ΔE. The difference voltage ΔE is amplified by the amplifier 44 and converted into a torque value, which is then output as an output signal.

The output signal is normally converted into a digital signal by an A/D converter, and this digital signal is supplied to a microprocessor, where it is computed and displayed as a torque value.

Next, one example of a process for assembling the torque detection apparatus configured as described above is explained.

(1) The rotating shaft 3 is inserted into the housing 2 so as to be rotatably supported thereby via the ball bearings 5a and 5b. The adapters 6a and 6b screwed into the threads 6c and 6d of the frame 2a, respectively, are installed at the respective ends of the housing 2. The frame 2a is fixed by the lock ring 7a screwed around the thread 6c of the adapter 6a.

(2) The cylindrical boss 11 of the crank 8b is inserted into the hole 17 of the gear holding member 13. Then, the detection section 21 is fitted into the cylindrical boss 11, and the screw 51 inserted into the screw insertion hole 26 is screwed and fixed in the thread 11a of the cylindrical boss 11. In this case, there remains a gap between the hole 17 of the gear holding member 13 and the cylindrical boss 11 of the crank 8b such that they will not come into contact.

(3) The recessed portion 16 in the gear holding member 13 is fitted to the flange 24 of the detection section 21. The nut 52 is inserted into the nut insertion hole 28 in the flange 24. The screw 53 is inserted into the screw insertion hole 18 in the gear holding member 13 and screwed into the nut 52. This allows the crank 8b, the detection section 21, and the gear holding member 13 to be integrally coupled together.

(4) The thread 6d of the adapter 6b screwed into the other end of the frame 2a is screwed and fixed in the tapped hole 34 of the coil unit 31.

(5) The detection section 21 attached to the crank 8b is inserted into the coil unit 31. The rotating shaft 3 is inserted into the hole 25 of the detection section 21 in such a way that there remains a gap between the shaft and the hole such that they will not come into contact. The fitting hole formed in the cylindrical boss 11 is fitted to the end of the rotating shaft 3, and fixed by screwing the bolt 9b into the tapped hole 4b. This allows the first and the second detection coils 35a and 35b to be opposed to the slits 27a and 27b formed in the detection section 21 at a small interval between the coils and the slits, thereby forming the torque detector 20.

(6) The gear 12 is contacted with one surface of the mounting section 19 of the gear holding member 13, and a small gear 12a is contacted with the other surface of the mounting section 19. The screw 53 inserted into the screw insertion hole in the gear 12 is screwed and fixed in the nut 52 inserted into the nut insertion hole formed in the small gear 12a and also inserted into the nut insertion hole 19a formed in the gear mounting section 19. The small gear 12a is not essential to this invention.

(7) Finally, the fitting hole in the crank 8a is fitted to the end of the rotating shaft 3 and fixed by the bolt 9a. *The assembly is thus completed.*

Figure 7:
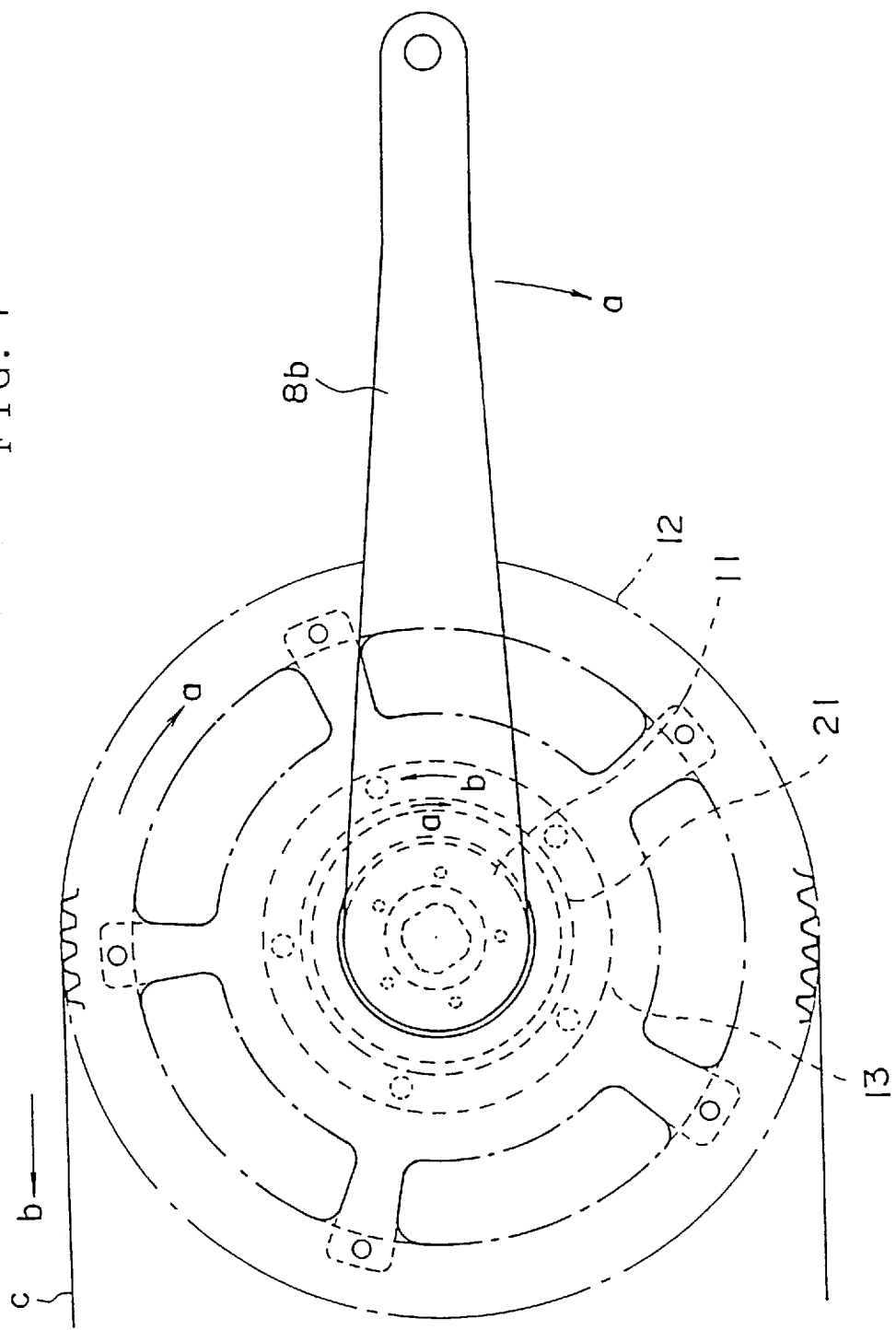
FIG. 7 describes the operation of the apparatus in FIG. 1.

Next, the operation of this torque detection apparatus is described. It is assumed that a chain is engaged with the gear 12. As shown in FIG. 7, when one of the pedals is stepped on to rotate the crank 8b in the direction shown by arrow (a) (the forward direction of the bicycle), the rotational force is transmitted to the gear 12 via the crank 8b, the cylindrical boss 11, the detection section 21, and the gear holding member 13. At this point, the detection section 21 integrally coupled to the crank 8b is subjected to torsional stress caused by the rotational force in the direction shown by arrow (a) and by the tension in the direction shown by arrow (b) which is caused by the chain C.

Thus, the slit 27a formed in the detection section 21 for applying magnetic anisotropy and located on the bottom 22 side is subjected to tensile stress, while the slit 27b formed in the detection section 21 for applying magnetic anisotropy and located on the flange 24 side is subjected to compressive stress. The permeability of the detection section 21 varies in response to the variation of these stresses.

The self-inductances of the first and the second detection coils 35a and 35b vary in response to the variation of the permeability of the detection section 21. Then, due to the variation of the impedance, the bridge circuit 40 outputs unbalanced voltages e1 and e2 corresponding to the magnitude of the torque applied to the detection section 21. These unbalanced voltages e1 and e2 are processed and output by the circuit described in FIG. 6. These output voltages have values corresponding to the torque applied to the rotating shaft 3.

When the other pedal is stepped on to rotate the crank 8a, the rotational force is transmitted to the gear 12 via the crank 8a, the rotating shaft 3, the cylindrical boss 11 of the crank 8b, the detection section 21, and the gear holding member 13. In this case, the transmission path and the rotational direction subsequent to the cylindrical boss 11 of the crank 8a are the same as in the crank 8b described above, and the gear 12 is subjected to the tension in the same direction as described above (shown by arrow (b)) which is caused by the chain C. The permeability of the detection section 21 thus varies through the same process as in the rotation of the crank 8b, and the voltage corresponding to the torque applied to the rotating shaft 3 by the crank 8a is output to an output terminal 45.

Figure 8:
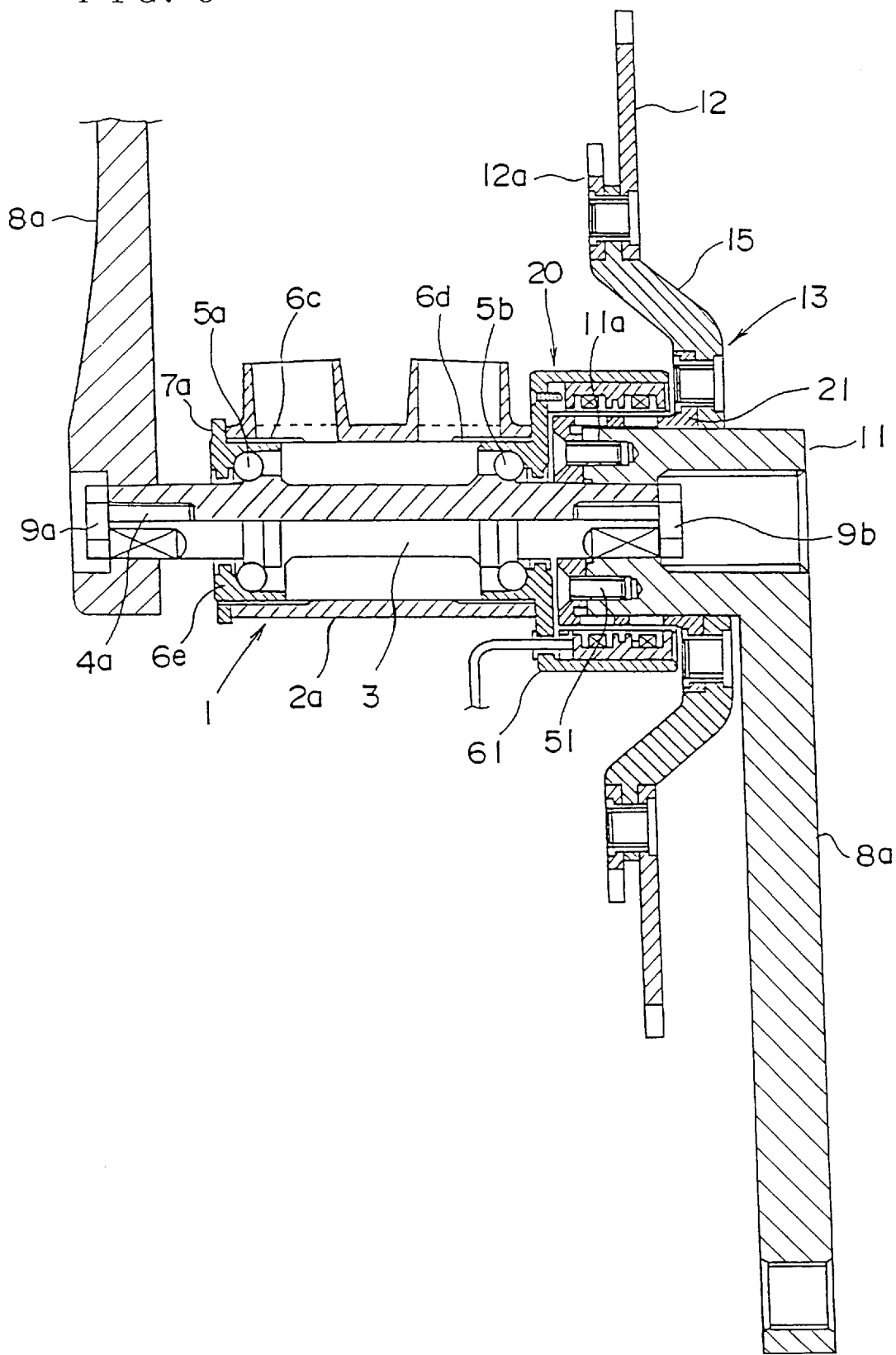
FIG. 8 is a vertical cross sectional view of another embodiment of this invention.

FIG. 8 is a vertical cross sectional view of another embodiment of this invention. In this embodiment, the structure of the coil unit according to the first embodiment is changed, the housing is omitted, and the frame incorporates the functions of the housing.

Figure 9:
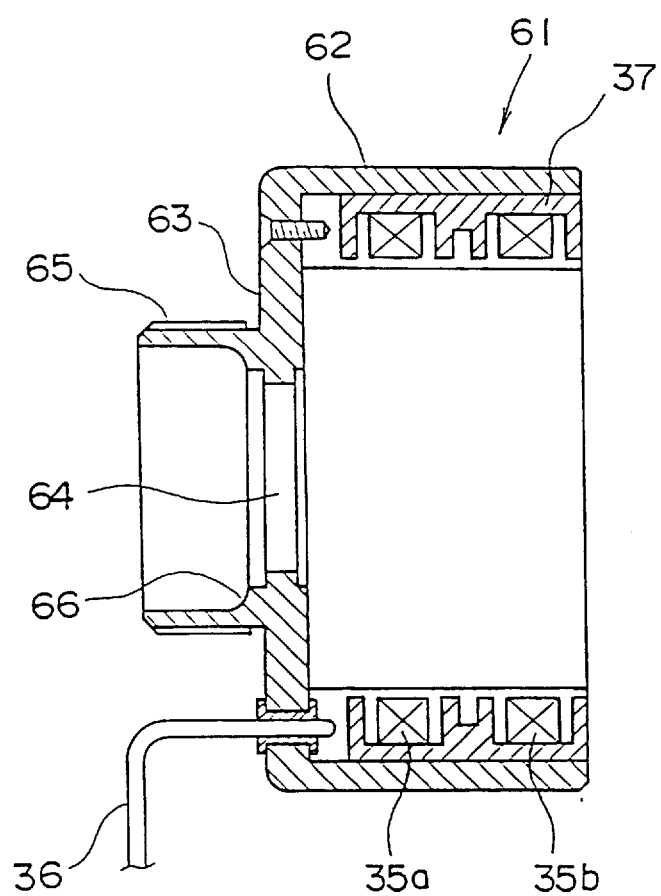
FIG. 9 is a partially enlarged view of FIG. 8.

As shown in FIG. 9, a coil unit 61 comprises a cylindrical portion 62 shaped like a bottomed cylinder, a through hole 64 that is formed in the center of the bottom 63 thereof and into which the rotating shaft 3 is inserted, and a cylindrical threaded portion 65 protruding outwardly from the bottom 63 around the outer circumference of the through hole 64. A holding section 66 for the ball bearing 5b is formed at the base of the inner wall of the threaded portion 65. Reference numerals 35a and 35b designate a first and a second detection coils, respectively, installed on the inner wall of the cylindrical portion 62.

To assemble this structure, the rotating shaft 3 is inserted into the frame 2a, the adapter 6e inserted into one end of the rotating shaft 3 is screwed into the thread 6c formed in the frame 2a with the ball bearing 5a held between the rotating shaft 3 and the adapter 6e.

Then, the other end of the rotating shaft 3 is inserted into the through hole 64 in the coil unit 61, and the threaded portion 65 is engaged with the thread 6d formed in the frame 2a with the ball bearing 5b held between the rotating shaft 3 and the frame. The fixing lock ring 7a is screwed around the threaded portion of the adapter 6e to integrally fix the frame 2a, the adapter 6e, and the coil unit 61 and to rotatably retain the rotating shaft 3.

Furthermore, the cranks 8b and 8a to which the detection section 21 and the gear holding member 13 have been attached, respectively, are installed on the rotating shaft 3.

The operation of the torque detection apparatus assembled in this manner is similar to that of the first embodiment. In this embodiment, however, the housing is omitted to allow one of the adapters to hold the ball bearing, and the other adapter is omitted to allow the coil unit to hold the ball bearing. As a result, the structure is simplified, and the number of required parts is reduced to enable the costs to be reduced.

Figure 10:
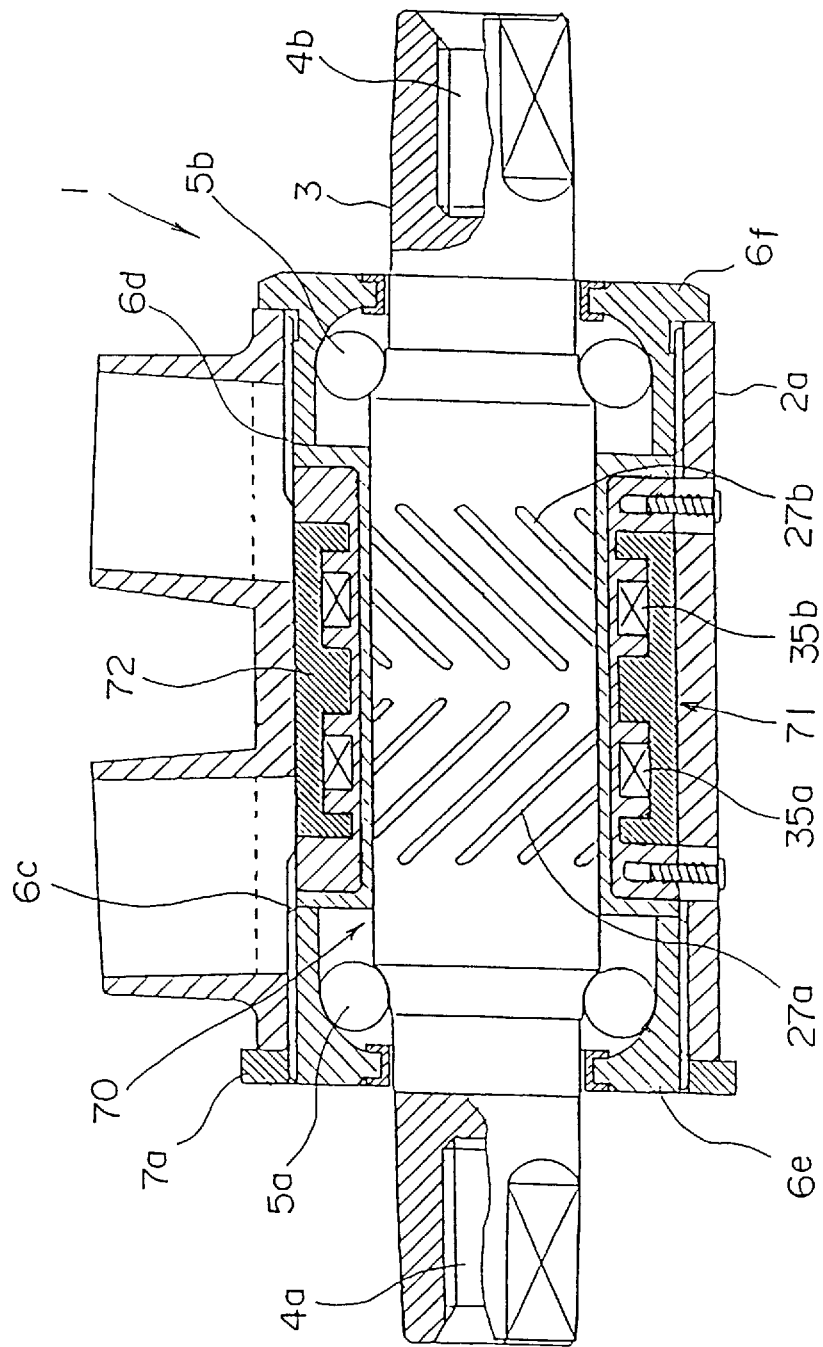
FIG. 10 is a vertical cross sectional view of yet another embodiment of this invention.

FIG. 10 is a vertical cross sectional view of yet another embodiment of this invention. In this embodiment, the detection section 21 is omitted, the recessed grooves 27a and 27b are directly formed in the rotating shaft 3, and the structure of the coil unit is changed accordingly. In the bottom bracket section 1, reference numeral 2a is a hollow frame, and the frame 2a has the rotating shaft 3 rotatably supported therein via the ball bearings 5a and 5b. The rotating shaft 3 comprises magnetic alloy such as Fe—Al or Fe—Ni alloy or Ni—Cr—Mo cement steel, and has a crank fitting section of a square cross section at both ends. The tapped holes 4a and 4b are formed in the center of the end, face of the rotating shaft 3.

Reference numerals 27a and 27b designate recessed grooves formed like chevrons in the outer circumference of the rotating shaft 3 near the longitudinal center thereof in such a way that they are laterally symmetrical and inclined in the opposite directions. These recessed grooves 27a and 27b serve to apply magnetic anisotropy to the rotating shaft 3 in the opposite directions. Reference numeral 71 denotes a cylindrical coil unit fixed to the inner wall of the frame 2a via with screws and having a first and a second detection coils 35a and 35b formed thereon via a yoke 72, with the rotating shaft 3 and the coil unit 71 constituting a torque detection section 70. Reference numeral 6e indicates an adapter that has a thread 6c in the outer circumference thereof and which is screwed into the thread formed in the inner circumference of the frame 2a to hold the ball bearing 5a. Reference numeral 6f designates an adapter having a collar portion and a thread 6d that is formed in its outer circumference and which is screwed into the thread formed in the inner circumference of the frame 2a in order to hold the ball bearing 5b. Reference numeral 7a denotes a lock ring.

In this embodiment, different rotating shafts 3 were produced using Fe—Al alloy containing 11.0 to 15.0 wt. % of Al with the remaining part substantially comprising Fe, Fe—Ni alloy containing 32 to 85 wt. % of Ni with the remaining part substantially comprising Fe, and Ni—Cr—Mo cement steel (SNCM815), respectively. The torque detection circuit in this embodiment has a similar constitution to that of the torque detection circuit 46 described in FIG. 6.

Figure 14:
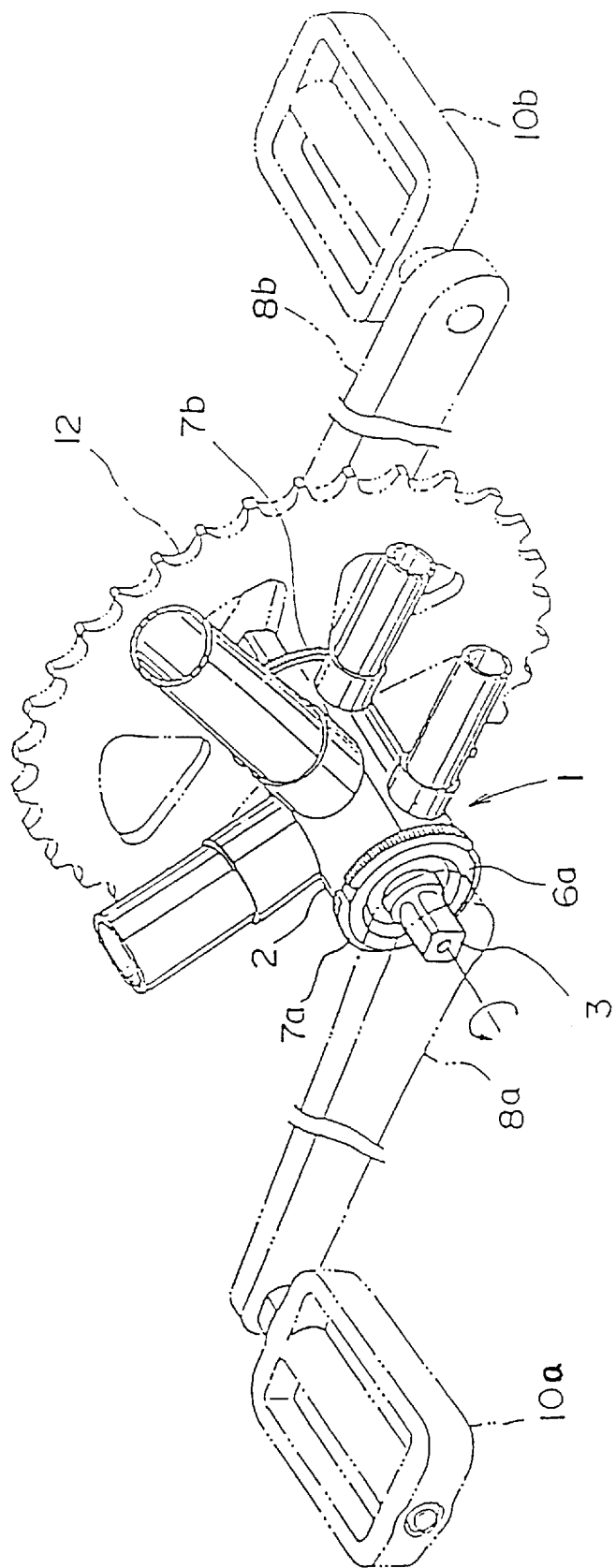
FIG. 14 is a perspective view showing one example of a bottom bracket section of a bicycle.

Next, one example of a process for assembling the torque detection device according to this embodiment is explained.
(1) The rotating shaft 3 was inserted into the frame 2a with the coil unit 71 installed around it. A large number of ball bearings 5a and 5d were disposed in appropriate positions. The adapters 6e and 6f were screwed into the threads of the frame 2a so as to hold the ball bearings 5a and 5b in the specified positions. The lock ring 7a was screwed around the thread of the adapter 6e to fix the frame 2a so as to rotatably hold the rotating shaft 3.
(2) As in FIG. 14, the base of the crank 8a with the pedal 10a was fitted on one fitting section of the rotating shaft 3 and fixed thereto with screws, while the base of the crank 8b with the gear 12 and the pedal 10b was fitted on the other fitting section of the rating shaft 3 and fixed thereto with screws. This finishes the assembly of the bottom bracket section 1.

Next, the operation of this torque detection apparatus is described. It is assumed that a chain C is engaged with the gear 12.

Figure 11:
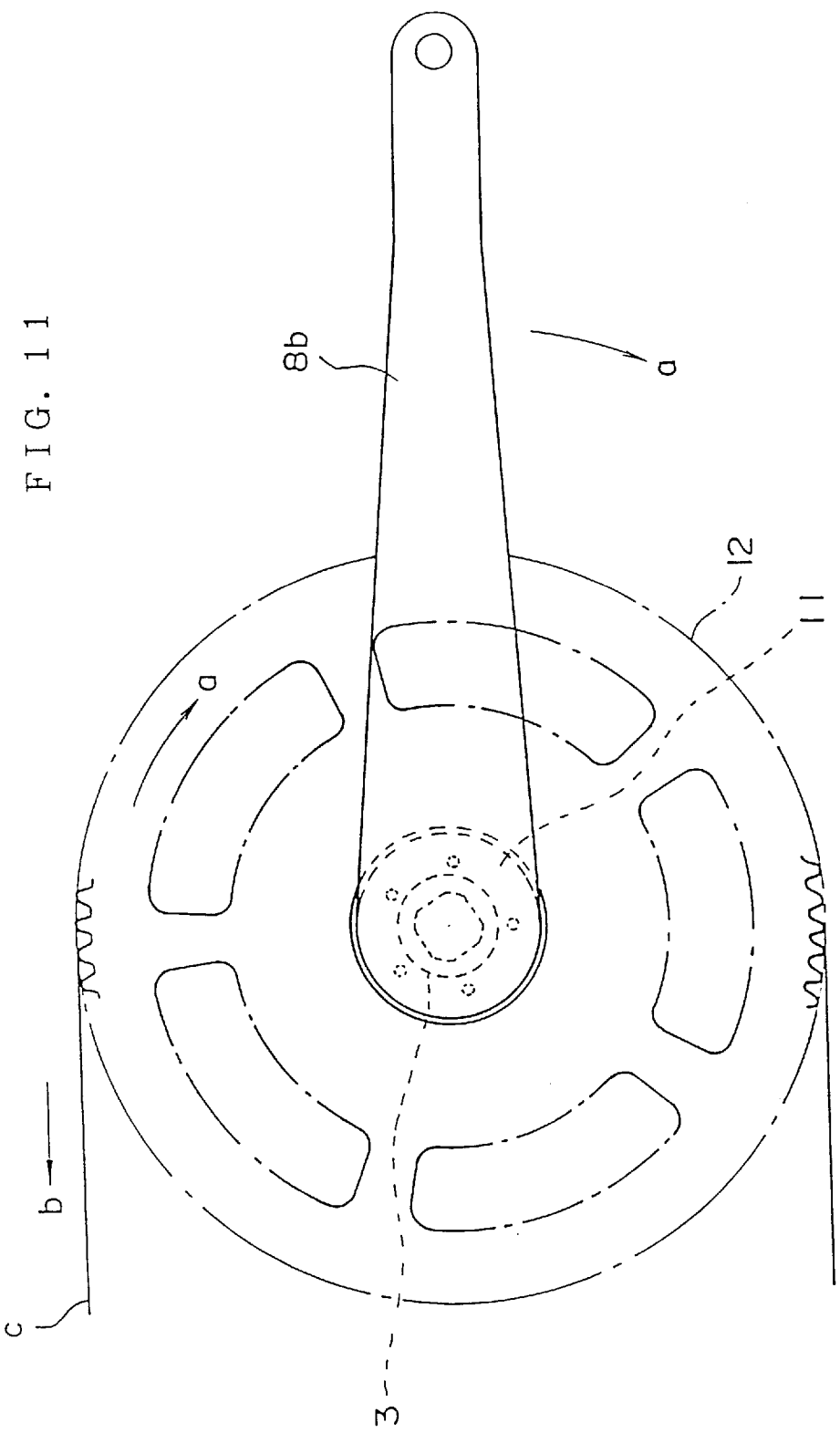
FIG. 11 describes the operation of the apparatus in FIG. 10.

As shown in FIG. 11, when one of the pedals is stepped on to rotate the crank 8b in the direction shown by arrow (a) (the forward direction of the bicycle), the rotational force is transmitted to the rotating shaft 3 from the crank 8b. At this point, the tare weight of the leg on the pedal to the other crank 8a causes torsional stress in the rotating shaft 3, and a torque is detected. This torque, however, has a negative value, and is thus neglected.

Next, when the other crank 8a is rotated in the direction shown by arrow (a), the tare weight of the leg is applied to the crank 8b, but the rotating shaft 3 is subjected to torsional stress in the direction shown by arrow a1 because the chain C is engaged with the gear 12 coupled to the rotating shaft 3.

Consequently, the recessed groove 27a formed in the rotating shaft 3 is subjected to tensile stress, whereas the recessed groove 27b also formed in the rotating shaft 3 is subjected to compressive stress, with the permeability of the rotating shaft 3 changed accordingly.

The self-inductances of the first and the second detection coils 35a and 35b vary in response to the variation of the permeability of the rotating shaft 3. The unbalanced voltages e1 and e2 corresponding to the variation of the impedance, thus the magnitude of the torque applied to the rotating shaft 3 is output to the bridge circuit 40. This output voltage has a value corresponding to the torque applied to the rotating shaft 3. In this manner, this embodiment allows the detection of the torque applied to the rotating shaft 3 while the gear 12 is making a single turn, that is, the pedal opposed to the gear 12 is stepped on.

In this embodiment, the value of the torque generated when the pedal opposed to the gear 12 is stepped on may be stored or saved using an electrical means and reproduced as an apparent value of the torque applied to the pedal when the pedal on the gear 12 side is stepped on. This invention is applicable to bottom bracket sections of other structures.

Next, a bicycle with the torque detector in FIG. 10 and a calculator for calculating the pedal stepping force based on the torque detected by the detector is discussed.

If the torque is referred to as Trq and the length of the crank 8a or 8b is referred to as R, pedal stepping force F may be expressed as:

$$F=Trq/R \text{ or } F \times R=Trq \qquad \text{[Equation 5]}$$

The detection of torque Trq allows pedal stepping force F to be obtained.

Workload dW applied by the stepping of the pedal is determined by multiplying the force applied to the pedal (pedal stepping force F) by the distance over which the pedal moves ds as follows:

$$dW=F \times ds \qquad \text{[Equation 6]}$$

The travelling distance ds of the pedal of the bicycle which is rotated dθ radian relative to the center of the rotating shaft 3 of the crank 8a or 8b can be determined by the following equation:

$$ds=R \times d\theta \qquad \text{[Equation 7]}$$

Workload W applied when the pedal is rotated θ radian is expressed by:

$$W = \int_0^\theta dW = \int_0^\theta F \times ds = \int_0^\theta F \times R \times d\theta \qquad \text{[Equation 8]}$$

Since F×R=Trq as shown in Equation 5, the following equation can be established.

$$W = \int_0^\theta Trq \, d\theta \qquad \text{[Equation 9]}$$

The unit of workload is joule (J). This is converted into nutritional heat quantity E. Since 1 calorie equals to 4.18× $10^3$ (J), the following equation can be established.

$$\begin{aligned} E &= W/(4.18 \times 10^3) \qquad \text{[Equation 10]} \\ &= 1/(4.18 \times 10^3) \int_0^\theta Trq \, d\theta \text{(calorie)} \end{aligned}$$

Pedal stepping force F reaches its maximum value twice during a single rotation of the gear 12, that is, when the right leg applies the largest force to the pedal and when the left leg applies the largest force to the pedal. The torque, however, is not detected when the pedal on the gear 12 side is stepped on (the right foot) but is detected only when the pedal opposed to the gear is stepped on, as described above. Thus, if the cycle in which the torque is detected is referred to as T, the rotational angular speed of the pedal is 2π/T radian. The rotational angle of the pedal dθ after period of time dt is thus 2π/T×dt.

When the torque is detected every period of time dt, consumed energy dE can be expressed as follows using measured cycle TK and the pedal stepping force FK determined on the basis of the torque.

$$dE=1/(4.18 \times 10^3) \times Trq \times 2\pi/TK \times dt$$

The energy E consumed when the pedal is rotated θ radian can be determined by carrying out the above calculation each time the torque is detected in order to calculate the amount of energy consumed during this cycle and adding the value obtained to the accumulative value of energy.

Figure 12:
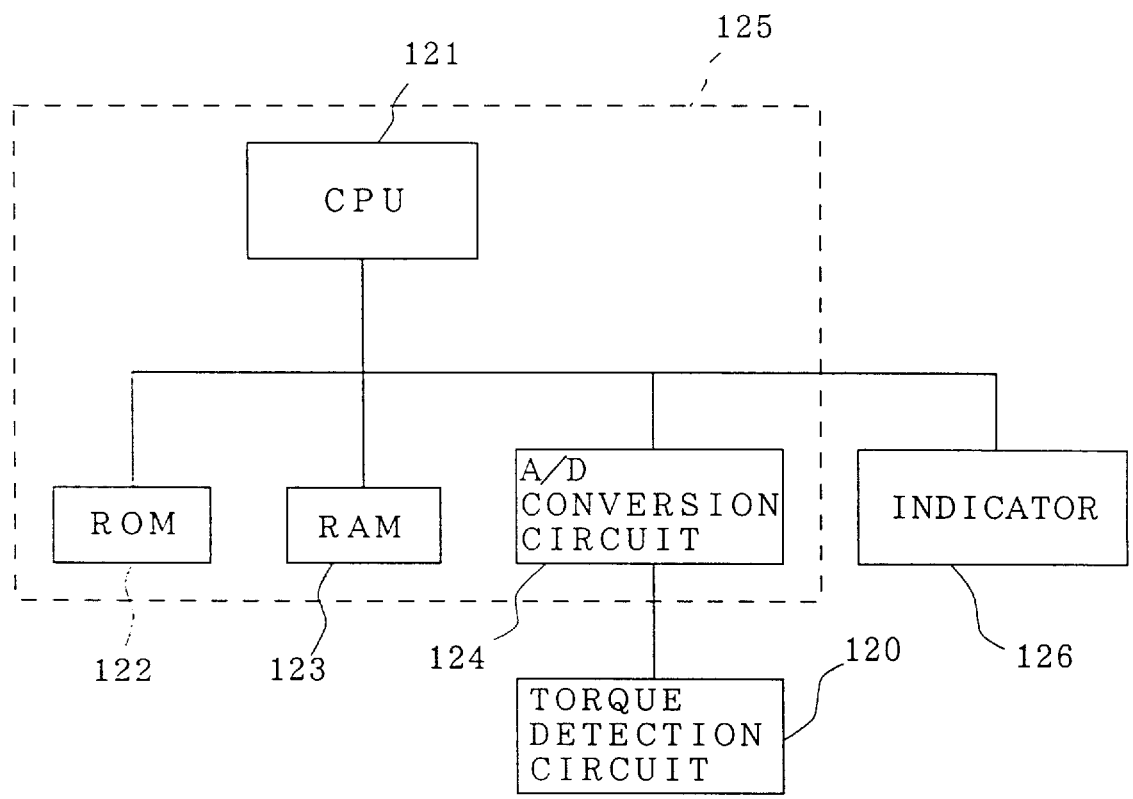
FIG. 12 is a block diagram of a circuit for measuring pedal stepping force.

FIG. 12 is a block diagram of a circuit for determining the pedal stepping force, the workload, and the consumed energy, which is used for the present bicycle. An analog signal corresponding to the torque of the rotating shaft 3 detected by a torque detection circuit 120 is converted by an A/D conversion circuit 124 into a digital signal, which is then supplied to a CPU 121. A program for calculating the pedal stepping force, the workload, and the consumed energy based on the torque detected by a ROM 122 is stored in a ROM 122, and a RAM 123 has a work area used during calculations. Signals are transferred between the ROM 122 and the RAM 123 and the CPU 121. The CPU 121, the ROM 122, the RAM 123, and the A/D conversion circuit 124 constitute a calculator 125.

The program in the ROM 122 comprises, for example, a main program and a timer interruption routine. The timer interruption routine activates an interruption every period of time (for example, every 10 msecs or 0.1 secs) to detect the torque and to measure the cycle, and the main program calculates the pedal stepping force, the workload, the consumed energy and so forth based on the torque and cycle detected by the timer interruption routine and displays them on an indicator 126 while the timer interruption routine is not operating. The value of the consumed energy is accumulated prior to display.

Next, a bicycle with a torque detection apparatus for detecting the torque generated when the pedal opposed to the gear 12 and the pedal on the gear 12 side are stepped on during a single rotation of the gear 12 is discussed. This, embodiment relates to a bicycle with the torque detection apparatus corresponding to FIG. 1 or 8 and a calculator for calculating the pedal stepping force based on the torque detected by the detection apparatus.

This embodiment also enables the pedal stepping force, the workload, and the consumed energy to be determined based on the detected torque. In this embodiment, the maximum torque generated by stepping on the pedal can be detected twice during a single rotation of the gear 12, so the rotational angular speed of the pedal is π/T radian.

Alternatively, a plurality of gears may be disposed in such a bicycle to allow a lever to be used to switch to a larger gear when a larger pedal stepping force is required,, for example, on an upward slope or to a smaller gear when a smaller pedal stepping force is required, for example, on a flat ground. In this case, the gears are set so as to be automatically switched when the detected torque (or the pedal stepping force) exceeds a predetermined value or becomes smaller than a predetermined value.

Figure 13:
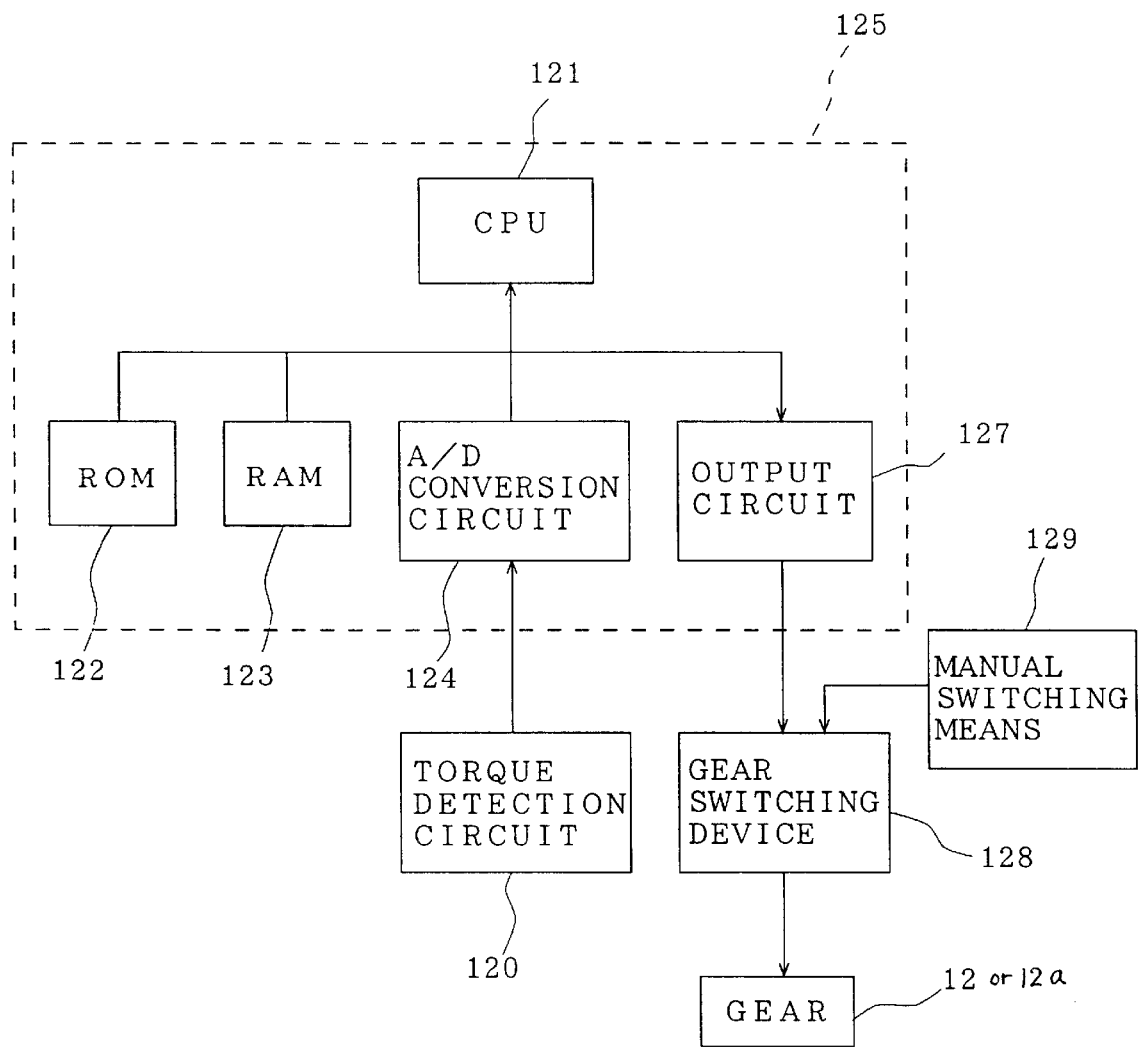
FIG. 13 is a block diagram of a gear switching circuit for a bicycle.

FIG. 13 is a block diagram showing a gear switching circuit of this bicycle. The RAM 123 stores gear switching information in the form of a table, as shown in Table 1, and this information is used to switch the gear according to the value of the torque detected by the torque detection circuit 120.

TABLE 1

| Torque value | Gear switching signals |
| --- | --- |
| Torque 1 | To a larger gear |
| Torque 2 | To a smaller gear |

The contents of the table are created at the initiation of the operation of the bicycle by copying to the RAM 123 the information that is stored in the ROM 122 and which is shown in Table 1 once the power to the calculator 125 is turned on to initiate an automatic gear switching mode. A setting means (not shown) may be used by the bicycle user to set the contents (in this case, the contents of the RAM 123 must be maintained during service interruption).

Although the gear switching device 128 automatically switches the gear 12 in response to an instruction from the calculator 125 (an automatic gear switching mode), a manual switching means 129 may be used to perform switching operations (a manual gear switching mode).

In the bicycle of the above configuration, during the automatic gear switching mode, the program stored in the ROM 122 constantly compares the torque value Trq input via the torque detection circuit 120 and the A/D conversion circuit 124 to the torque values in the table in Table 1.

At the initiation of the operation of the bicycle, a larger torque is generated due to a larger pedal stepping force, so relationship Trq>torque 1 in the table in Table 1 is established. This causes the calculator 125 to obtain from the table a signal for switching to the larger gear side and to output it to the gear switching device 128 via an output circuit 127. In response to this signal, the gear switching device 128 switches the gear 12 to a larger one. After the switching, the torque continues to decrease for some time. If Trq>torque 1 is maintained after a specified period of time has passed, the gear is switched to a further larger one using the above process.

By repeating such a switching process, the largest gear is finally selected. Once this happens, the gear switching device 128 does not operate even when the signal for switching to a larger gear is output from the calculator 125, and the largest gear remains selected.

When the bicycle starts to travel, and the magnitude of required pedal stepping force is reduced to reduce the torque, relationship torque 2<Trq<torque 1 is established. The calculator 125 then outputs no gear switching signal.

Next, when the bicycle increases its speed to reduce the torque and relationship Trq<torque 2 is established, the calculator 125 obtains from the RAM 123 a signal for switching to a smaller gear, and outputs this switching signal to the gear switching device 128 via the output circuit 127. Based on this signal, the gear switching device 128 switches the gear to a smaller one. After the gear has been switched to a smaller one, the torque continues to increase for some time.

As the bicycle further increases its speed, the above process is repeated until the smallest gear is selected. Once this happens, the gear switching device 128 does not operate even when the signal for switching to a smaller gear is output to the gear switching device 128, and the smallest gear remains selected.

As described above, a very convenient bicycle can be implemented by automatically switching the gear of the bicycle based on the detected torque.

We claim:

1. A bicycle having a pair of cranks each having a pedal to allow a user to step on said pedal to turn said cranks and drive a gear engaged with a chain comprising:

a torque detector comprising a rotatable shaft, connected to said cranks, said shaft being made of magnetostrictive alloy, said shaft having magnetic anisotropy provided by groups of hollows formed laterally and symmetrically on an outer circumference of said rotatable shaft and inclined in opposite directions, and a coil unit formed as a cylinder, having detection coils therein and disposed around the outer circumference of said rotatable shaft; and a calculator for calculating a magnitude of pedal stepping force based on torque detected by said torque detector.

2. A bicycle according to claim 1 wherein said groups of hollows are in the form of slits.

3. A bicycle according to claim 1 wherein said groups of hollows are in the form of recessed grooves.

4. A bicycle according to claim 1 wherein said rotatable shaft comprises Fe—Al alloy.

5. A bicycle according to claim 1 wherein said rotatable shaft comprises Fe—Ni alloy.

6. A bicycle according to claim 1 wherein said rotatable shaft comprises Ni—Cr—Mo cement steel.

7. A bicycle according to claim 1 wherein said calculator calculates an amount of consumed energy on the basis of the torque detected by said torque detector.

8. A bicycle according to claim 1 including a gear switching means for automatically switching gears based on the torque detected by said torque detector.

9. A bicycle according to claim 7 including an indicator for indicating a value selected from the group consisting of torque, pedal stepping force, and consumed energy.

10. A bicycle having a pair of cranks each having a pedal, and a rotatable shaft having opposite ends at which said cranks are attached to allow a user to step on the pedals to turn said cranks and drive a gear engaged with a chain, comprising:

a torque detector comprising a detection section of magnetostrictive alloy, said torque detector being formed as a bottomed cylinder, having magnetic anisotropy provided by groups of hollows formed laterally and symmetrically in said cylindrical detection section and inclined in opposite directions, said detection section being coupled integrally to one of said cranks, and a coil unit also formed as a bottomed cylinder, having detection coils on an inner circumference thereof, and disposed around the outer circumference of said detection section; and a calculator for calculating a magnitude of pedal stepping forced based on torque detected by said torque detector.

11. A bicycle according to claim 10 wherein said groups of hollows are in the form of slits.

12. A bicycle according to claim 10 wherein said groups of hollows are in the form of recessed grooves.

13. A bicycle according to claim 10 wherein said detection section comprises Fe—Al alloy.

14. A bicycle according to claim 11 wherein said detection section comprises Fe—Ni alloy.

15. A bicycle according to claim 11 wherein said detection section comprises Ni—Cr—Mo cement steel.

16. A bicycle according to claim 11 wherein said calculator calculates an amount of consumed energy on the basis of the torque detected by said torque detector.

17. A bicycle according to claim 11 including a gear switching means for automatically switching gears based on the torque detected by said torque detector.

18. A bicycle according to claim 11 including an indicator for indicating a value selected from the group consisting of torque, pedal stepping force, and consumed energy.

19. A torque detection apparatus for a bicycle, comprising:

a detection section of magnetostrictive alloy formed as a bottomed cylinder and having magnetic anisotropy provided by groups of hollows formed laterally and symmetrically in said cylindrical detection section and inclined in opposite directions; and a coil unit also formed as a bottomed cylinder, having first and second detection coils therein disposed around an outer circumference of said detection section so that said first and second detection coils are opposed to said groups of said hollows, said detection section being integrally connectable to a crank rotated by a pedal.

20. A torque detection apparatus for a bicycle according to claim 19 wherein said groups of hollows are formed as slits.

21. A torque detection apparatus for a bicycle according to claim 19 wherein said groups of hollows are formed as recessed grooves.

22. A torque detection apparatus for a bicycle, comprising:

a rotatable shaft of magnetostrictive alloy having magnetic anisotropy provided by groups of slits formed laterally and symmetrically on an outer circumference of said rotatable shaft as inclined in opposite directions; and a coil unit formed as a cylinder, having first and second detection coils therein, and disposed around the outer circumference of said rotatable shaft so that said first and second coils are respectively opposed to said groups of hollows, an end of said rotatable shaft being integrally coupled to a crank rotated by a pedal of the bicycle.

23. A torque detection apparatus for a bicycle according to claim 22 wherein said groups of hollows are formed as slits.

24. A torque detection apparatus for a bicycle according to claim 22 wherein said groups of hollows are in the form of recessed grooves.

* * * * *